United States Patent
Wang et al.

(10) Patent No.: US 9,459,663 B2
(45) Date of Patent: Oct. 4, 2016

(54) DOOR ASSEMBLY AND ELECTRONIC DEVICE

(71) Applicant: HTC Corporation, Taoyuan County (TW)

(72) Inventors: Chi-Jer Wang, Taoyuan County (TW); Chien-Hung Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 311 days.

(21) Appl. No.: 14/054,837

(22) Filed: Oct. 16, 2013

(65) Prior Publication Data

US 2015/0103480 A1    Apr. 16, 2015

(51) Int. Cl.
*G06F 1/16* (2006.01)
*H04M 1/02* (2006.01)

(52) U.S. Cl.
CPC ........... *G06F 1/1658* (2013.01); *G06F 1/1656* (2013.01); *H04M 1/0274* (2013.01); *H04M 1/0214* (2013.01)

(58) Field of Classification Search
CPC G06F 1/1658; G06F 1/1656; H04M 1/0274; H04M 1/0214
See application file for complete search history.

(56) References Cited

U.S. PATENT DOCUMENTS

| 5,014,909 | A | * | 5/1991 | Yasuo | H04N 5/64 174/16.1 |
|---|---|---|---|---|---|
| 5,811,728 | A | * | 9/1998 | Maeda | H02G 3/083 16/2.2 |
| 5,956,291 | A | * | 9/1999 | Nehemiah | B63C 11/26 367/131 |
| 7,354,285 | B1 | | 4/2008 | Lin | |
| 7,766,678 | B1 | | 8/2010 | Abe | |
| 8,523,614 | B2 | * | 9/2013 | Matsunaga | H01R 12/716 439/630 |
| 8,622,646 | B2 | * | 1/2014 | Quan | H05K 5/0239 361/679.39 |
| 8,770,995 | B2 | * | 7/2014 | Naito | H01R 13/635 439/159 |
| 2011/0069428 | A1 | * | 3/2011 | Dong | H04M 1/0274 361/679.01 |
| 2012/0176753 | A1 | * | 7/2012 | Wang | H04M 1/026 361/748 |
| 2012/0307451 | A1 | * | 12/2012 | Shukla | G06K 13/0831 361/699 |
| 2013/0025932 | A1 | * | 1/2013 | Hsu | H02G 3/088 174/653 |
| 2013/0126533 | A1 | * | 5/2013 | Klosky | B65D 25/00 220/560 |

(Continued)

FOREIGN PATENT DOCUMENTS

| TW | 201310801 | 3/2013 |
|---|---|---|
| TW | 201311109 | 3/2013 |
| TW | 201313094 | 3/2013 |

OTHER PUBLICATIONS

"Office Action of Taiwan Counterpart Application", issued on Apr. 7, 2015, p. 1-p. 10.

*Primary Examiner* — Courtney Smith
*Assistant Examiner* — Keith Depew
(74) *Attorney, Agent, or Firm* — Jianq Chyun IP Office (57) ABSTRACT

A door assembly disposed at an opening of a casing of an electronic device is provided. An insertion hole provided at a side of the casing close to the opening for an pin to be inserted into the casing through the insertion hole. The door assembly includes a door cap and a rejecting module. The door cap is at least partially connected to the casing and corresponding to the opening. The rejecting module is disposed in the casing and corresponding to the door cap. The rejecting module is configured to push the door cap to expose the opening when the pin is inserted into the casing through the insertion hole. An electronic device is also provided, which includes a casing and the door assembly.

20 Claims, 7 Drawing Sheets

(56) References Cited

U.S. PATENT DOCUMENTS

2013/0235511 A1* 9/2013 Lu ................. H04M 1/0274
  361/679.01
2014/0084770 A1* 3/2014 Tsai ..................... G06F 1/181
  312/326
2014/0170871 A1* 6/2014 Wu ..................... H01R 13/447
  439/131

* cited by examiner

DOOR ASSEMBLY AND ELECTRONIC DEVICE

BACKGROUND

1. Field of the Application

The application relates to a door assembly, and more particularly, to a door assembly and an electronic device using the door assembly.

2. Description of Related Art

With advancements in technology industry, an electronic device such as a mobile phone, a notebook computer and a tablet computer have been widely adopted in daily life to provide desired information for a user at anytime, and the electronic device is developed to meet design requirements of easy operation, multiple functionality, and attractive exterior design. At the same time, the electronic device is gradually designed towards a trend of being lighter, thinner, shorter and smaller, so as to improve both operability and portability of the electronic device.

In the electronic device, an opening is usually disposed at a lateral side of a casing, and a connection port corresponding to the opening is disposed in the casing, so that the electronic device may be connected to an external device through the connection port, or an additional electronic element may be inserted into the connection port to expand functions of the electronic device. For instance, the connection port for inserting a memory card may be disposed in the electronic device, so that a storage capacity of the electronic device may be increased by the memory card being inserted additionally. At the same time, capabilities of water proofing and dust proofing of the electronic device may be lowered, thus dust or moisture in the air may easily enter inside the electronic device through the opening to cause damages. Therefore, a door cap is usually disposed in the electronic device for covering the opening and the connection port, so as to prevent dust or moisture from entering through the opening to damage the electronic device. The door cap is commonly provided with a structure disposed at an outer surface thereof for the user to lift up the door cap manually. For instance, a recess may be formed at an edge of the door cap and served as a finger grip portion, so that the door cap may be lift up outwardly by the user buckling the finger grip portion with fingers. However, the structure located at the outer surface of the door cap may ruin the exterior design of the electronic device, and prone to dust accumulation. In addition, an operating method for opening the door cap with said structure is also relatively more inconvenient.

SUMMARY

The application provides a door assembly with capabilities of water proofing and dust proofing as well as an easier opening method.

The application provides an electronic device having capabilities of water proofing, dust proofing and an easier opening method, as well as a flat and seamless profile which provides an attractive exterior design hard to accumulate dust.

The door assembly of the application is disposed at an opening of a casing of an electronic device, in which an insertion hole is provided at a side of the casing close to the opening for an pin to be inserted into the casing through the insertion hole. The door assembly includes a door cap and a rejecting module. The door cap is at least partially connected to the casing and corresponding to the opening. The rejecting module is disposed in the casing and corresponding to the door cap. The rejecting module is configured to push the door cap to expose the opening when the pin is inserted into the casing through the insertion hole.

The electronic device of the application includes a casing and the door assembly. The casing includes an opening and an insertion hole. The insertion hole is provided at a side close to the opening for a pin to be inserted into the casing through the insertion hole. A door assembly is disposed at the opening of the casing. The door assembly includes a door cap and a rejecting module. The door cap is at least partially connected to the casing and corresponding to the opening. The rejecting module is disposed in the casing and corresponding to the door cap. The rejecting module is configured to push the door cap to expose the opening when the pin is inserted into the casing through the insertion hole.

Based on above, in the door assembly and the electronic device of the application, the rejecting module is disposed in the casing and corresponding to the door cap, and the pin is utilized to be inserted into the casing through the insertion hole to push the rejecting module, so that the rejecting module is pushed against by the pin to push the door cap to expose the opening. As a result, the door assembly may have capabilities of water proofing and dust proofing as well as an easier opening method. Besides capabilities of water proofing, dust proofing and an easier opening method, the electronic device may also include a flat and seamless profile which provides an attractive exterior design hard to accumulate dust.

To make the above features and advantages of the disclosure more comprehensible, several embodiments accompanied with drawings are described in detail as follows.

DESCRIPTION OF THE EMBODIMENTS

Figure 1:
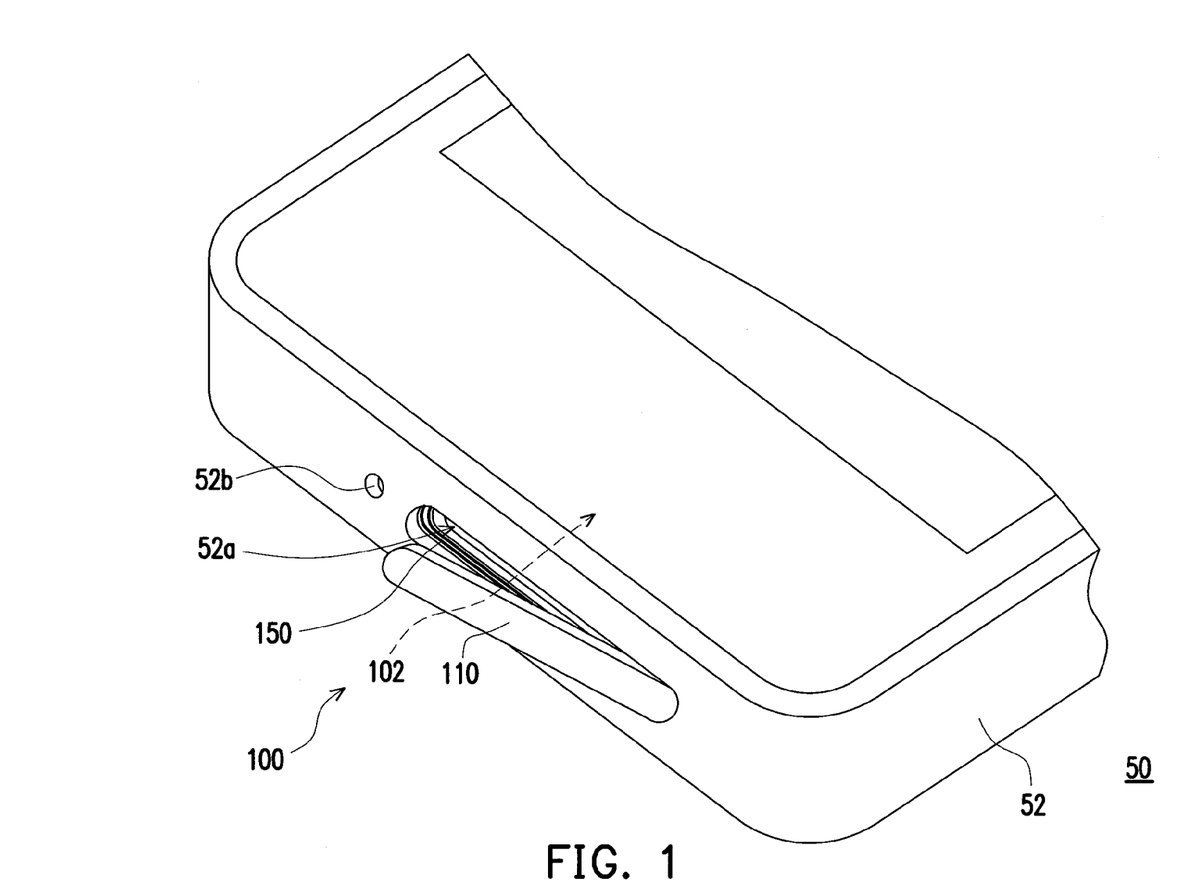
FIG. 1 is a 3D diagram of an electronic device according to an embodiment of the application.
Figure 2:
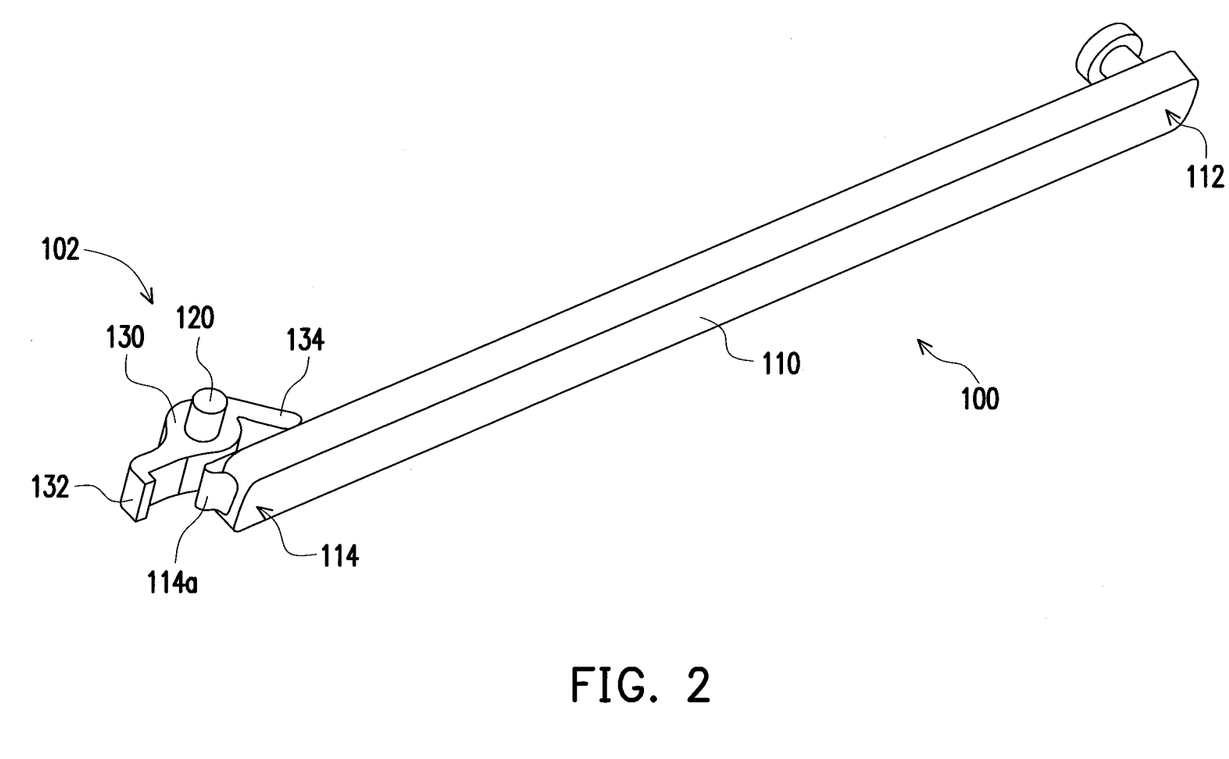
FIG. 2 is a 3D diagram of the door assembly depicted in FIG. 1.
Figure 3A:
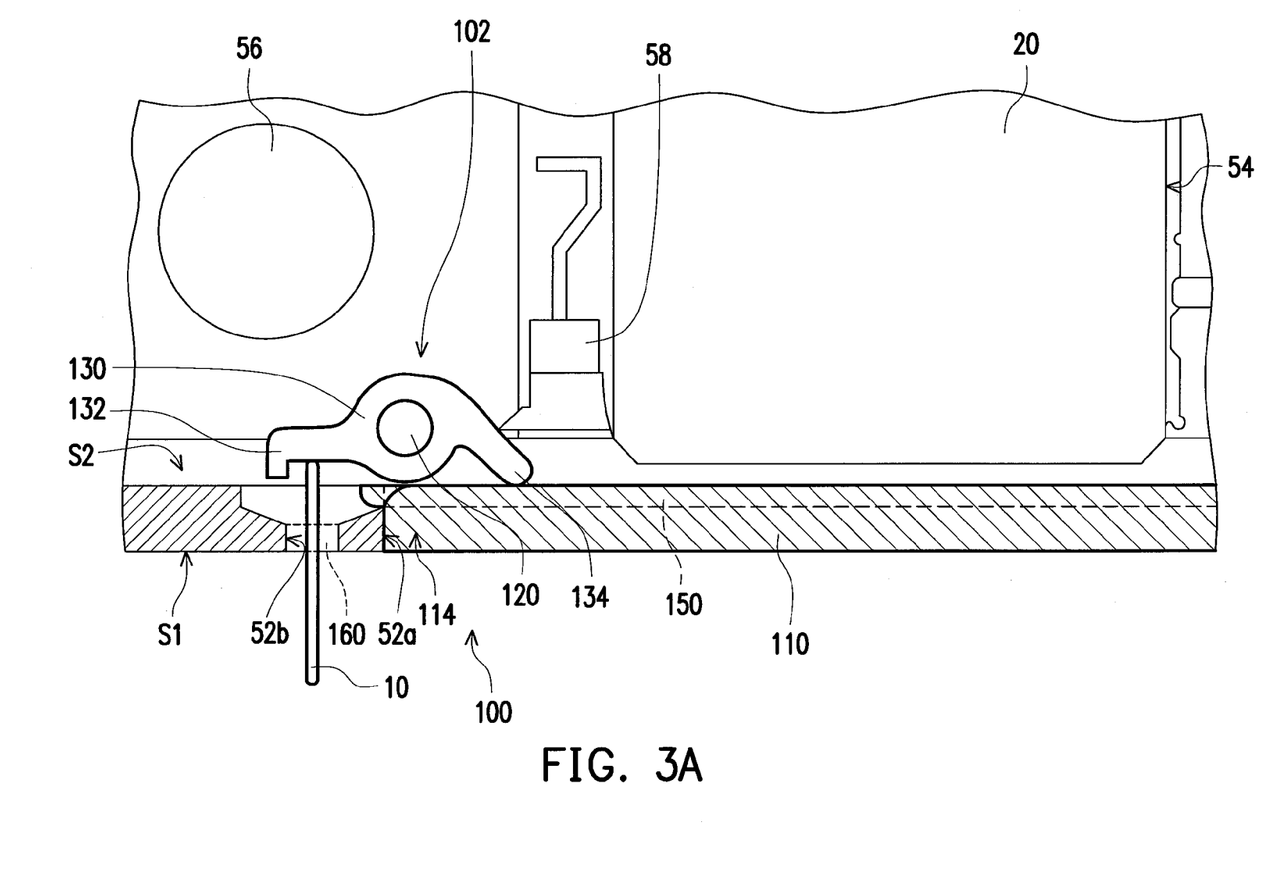
FIG. 3A is a schematic diagram of the electronic device depicted in FIG. 1 when the door cap is not opened.

FIG. 1 is a 3D diagram of an electronic device according to an embodiment of the application. FIG. 2 is a 3D diagram of the door assembly depicted in FIG. 1. FIG. 3A is a schematic diagram of the electronic device depicted in FIG. 1 when the door cap is not opened. Referring to FIG. 1, FIG. 2 and FIG. 3A, in the present embodiment, an electronic device 50 includes a casing 52 and a door assembly 100. The casing 52 includes an opening 52a and an insertion hole 52b. The door assembly 100 is disposed at the opening 52a of the casing 52 of the electronic device 50, and the insertion hole 52b is provided at a side close to the opening 52a for an pin 10 to be inserted into the casing 52 through the insertion hole 52b. Accordingly, in the electronic device 50, the door assembly can be actuated by the pin 10. The electronic device 50 is, for example, a smart phone, but a type of the electronic device 50 is not particularly limited in the application.

In the present embodiment, the door assembly 100 includes a door cap 110 and a rejecting module 102. The door cap 110 is at least partially connected to the casing 52 and corresponding to the opening 52a. For instance, an end of the door cap 110 may be connected to a part of the casing 52 close to the opening 52a. Further, the rejecting module 102 is disposed in the casing 52 and corresponding to the door cap 110. Accordingly, the rejecting module 102 can push the door cap 102 to expose the opening 52a when the pin 10 is inserted into the casing 102 through the insertion hole 52b.

More specifically, in the present embodiment, the door cap 110 is disposed at the opening 52a to cover the opening 52a, and the door cap 110 includes a first end 112 and a second end 114 opposite to the first end 112, in which the first end 112 is connected to the casing 52. The rejecting module 102 includes a pivot 120 and a rotating member 130. The pivot 120 is disposed in the casing 52. The rotating member 130 is pivoted in the casing 52 through the pivot 120 and close to the second end 114 of the door cap 110. Accordingly, the rotating member 130 may rotate relatively to the door cap 110 by the pivot 120. The rotating member 130 includes a driving portion 132 and a pushing portion 134 disposed at two opposite side of the pivot, respectively. The driving portion 132 is corresponding to the insertion hole 52b, and the pushing portion 134 is corresponding to the second end 114 of the door cap 110. Accordingly, the rotating member 130 may generate a rotation by driving the driving portion to move, and the pushing portion shifts accordingly, for example, along the pivot 120 to rotate towards a clockwise direction of FIG. 3A. However, a rotating direction of the rotating member 130 is not particularly limited in the application.

Figure 3B:
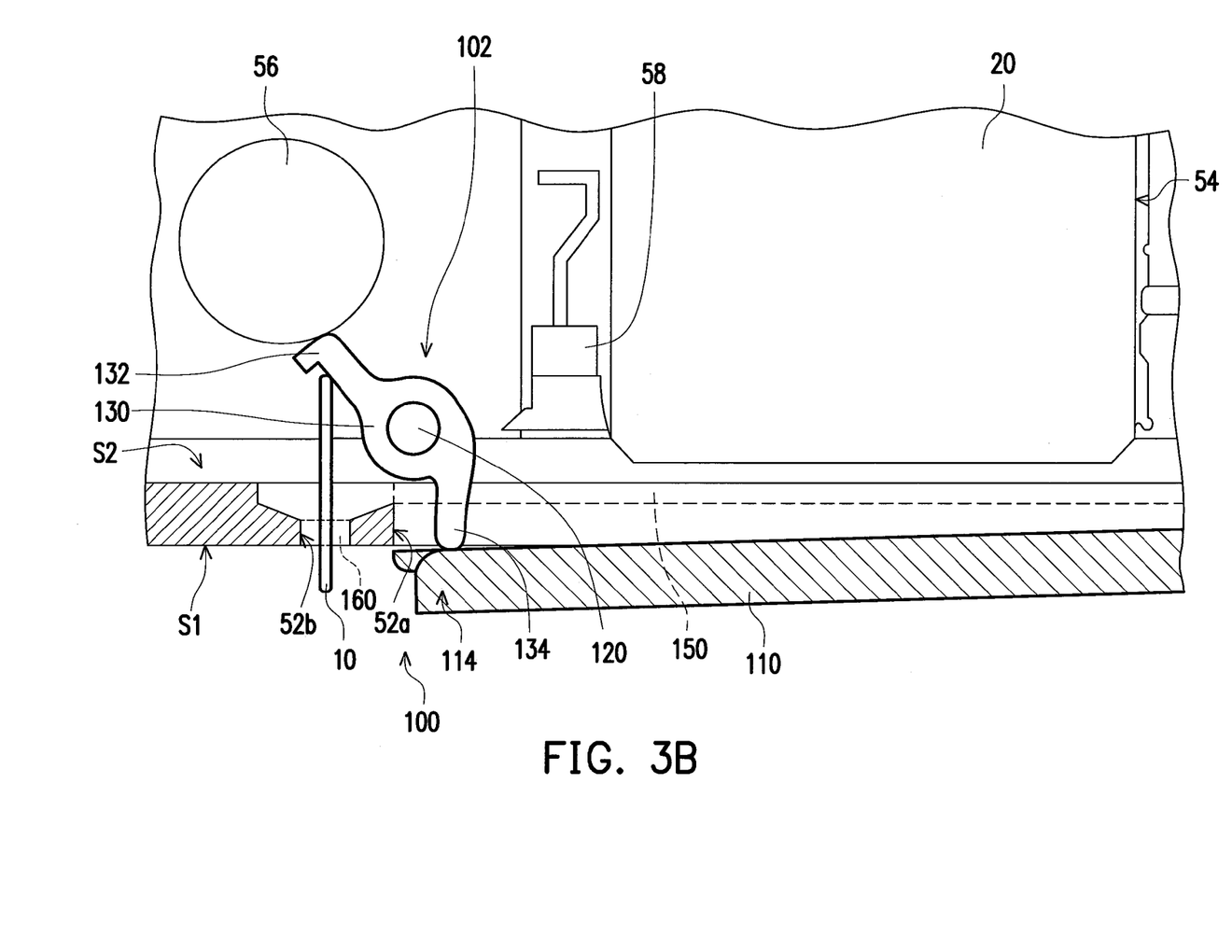
FIG. 3B is a schematic diagram of the electronic device depicted in FIG. 3A when the door cap is opened.

FIG. 3B is a schematic diagram of the electronic device depicted in FIG. 3A when the door cap is opened. Referring to FIG. 3A and FIG. 3B, in the present embodiment, since the driving portion 132 is corresponding to the insertion hole 52b, when the pin 10 is inserted into the casing 52 through the insertion hole 52b, the pin 10 may push against the driving portion 132 of the rotating portion 132 for rotating the rotating member along the pivot 120. Meanwhile, since the pushing portion 134 is corresponding to the second end 114 of the door cap 110, the pushing portion 134 may push the second end 114 of the door cap 110 through the rotation of the rotating member 130, as shown in FIG. 3A to FIG. 3B. When the second end 114 of the door cap 110 is pushed by the pushing portion 134, a relative movement is generated between the second end 114 of the door cap 110 and the first end 112 connected to the casing 52, so as to move the second end 114 of the door cap 110 to move from the opening 52a towards outside of the casing 52. Accordingly, when the pin 10 is inserted into the casing 52 through the insertion hole 52b and pushes against the pushing portion 134, the driving portion 132 pushes the second end 114 of the door cap 110 through the rotation of the rotating member 130 along the pivot 120, so as to expose the opening 52a.

Furthermore, in the present embodiment, the casing 52 practically includes a lateral surface S1 and a bottom surface S2 connected to the lateral surface S1. The opening 52a and the insertion hole 52 of the casing 52 are located at the lateral surface S1. The door cap 110 disposed at the opening 52a is also located at the lateral surface S1. The pivot 120 and the rotating member 130 are located at the bottom surface S2. When the rotating member 130 rotates along the pivot 120, the rotating member 130 rotates on the bottom surface S2 to push the door cap 110 located at the lateral surface S1. After the door cap 110 is pushed by the rotating member 130 to move outside of the casing 52, a user may manually move the second end 114 of the door cap 110 towards the first end 112 (not illustrated), so as to completely expose the opening 52a.

In the present embodiment, the electronic device 50 further includes a connection port 54 disposed in the casing 52 and corresponding to the opening 52a. The connection portion 54 is, for example, an electrical card connection port configured to connect an electrical card 20 such as a secure digital (SD) memory card, a Micro SD memory card, or memory cards or electrical cards of other types. A type of the connection port 54 usually includes a push-push type, a tray type or a push-pull type. In a push-push type connection port, the electrical card 20 is pushed into the connection port 54 through the opening 52a, and in case of removal, the electrical card 20 is again pushed into the connection port 54 to be released from a fixation of the connection 54 and removed from the opening 52a. A space required for the connection portion 54 of the push-push type is relatively smaller, thus the opening 52a may be designed to be smaller for the casing 52. In a tray type connection port, the electrical card 20 is placed on a tray and fixed by a structure after the tray is inserted into the connection port 54, and in case of removal, the tray is removed from the connection port 54 through a removal mechanism. Further, in a push-pull type connection port, the electrical card 20 is directed inserted into the connection port 54, in case of removal, the electrical card 20 is pulled out from the connection 54 in a manual manner. The push-pull type requires the opening 52a to be relatively greater for pulling out the electrical card 20. Nonetheless, types of the electrical card 20 and the connection 54 are not particularly limited in the application. The opening 52a exposes the connection port 54 when the door cap 110 moves from the opening 52a towards outside of the casing 52. Accordingly, the electrical card 20 may be inserted into the connection port 54 through the opening 52a and located in the casing 52. At the same time, the door cap 110 may be moved again to opening 52a without being interfered by the electrical card 20, so as to cover the opening 52a and both the connection portion 54 and the electrical card 20 located in the casing 52, as shown in FIG. 3B to FIG. 3A.

Similarly, when it comes to remove the electrical card 20 inserted in the connection port 54 and located in the casing 52, the door cap 110 may be pushed by the rotating member 130 to move towards outside of the casing 52 to expose the opening 52 for removing the electrical card 20. Once the electrical card 20 is removed, the door cap 110 may be moved again to the opening 52a, so as to cover the opening 52a. In view of above, the door assembly 100 may be opened by driving of the pin 10. Therefore, other opening structures such as a finger grip portion for the user to open the door cap 110 directly using fingers thereby ruin the exterior design of the electronic device 50, is not required to be disposed on the door cap 110 of the door assembly 100. Accordingly, an easier opening method for the door assembly 100 is provided, so that the electronic device 50 may have a more preferable exterior design. In addition, the pin 10 may be a needle or a component that is slim and capable of passing through the insertion hole 52*b*, and the user of the electronic device 50 may selectively use objects nearby as the pin 10. As a result, an easier operating method for the electronic device 50 is provided.

Furthermore, in the present embodiment, the electronic device 50 further includes a first restraint member 56 and a second restraint member 58 respectively disposed in the casing 52 and located at the bottom surface S2. The first restraint member 56 is close to the driving portion 132 of the rotating member 130, and the second restraint member 58 is close to the pushing portion 134 of the rotating member 130. When the pin 10 pushes against the driving portion 132, the rotating member 130 rotates along the pivot 120 until the driving portion 132 leans against the first restraint member 56, as shown in FIG. 3A to FIG. 3B. When the pin 10 moves towards outside of the casing 52 from contacting the rotating member, the rotating member 130 may rotate inversely until the pushing portion 134 leans against the second restraint member 58, as shown in FIG. 3A to FIG. 3A. In other words, a swing travel of the rotating member 130 may be limited by the first restraint member 56 and the second restraint member 58, so as to prevent the rotating member 130 from rotating into an unexpected status. The first restraint member 56 and the second restraint member 58 may be electronic elements (such as a connector) of a printed circuit board (PCB) disposed on the bottom surface S2, or a convex pillar or a stopper block formed on the casing 52 or on the printed circuit board. Types of the first restraint member 56 and the second restraint member 58 are not particularly limited in the application.

Figure 4A:
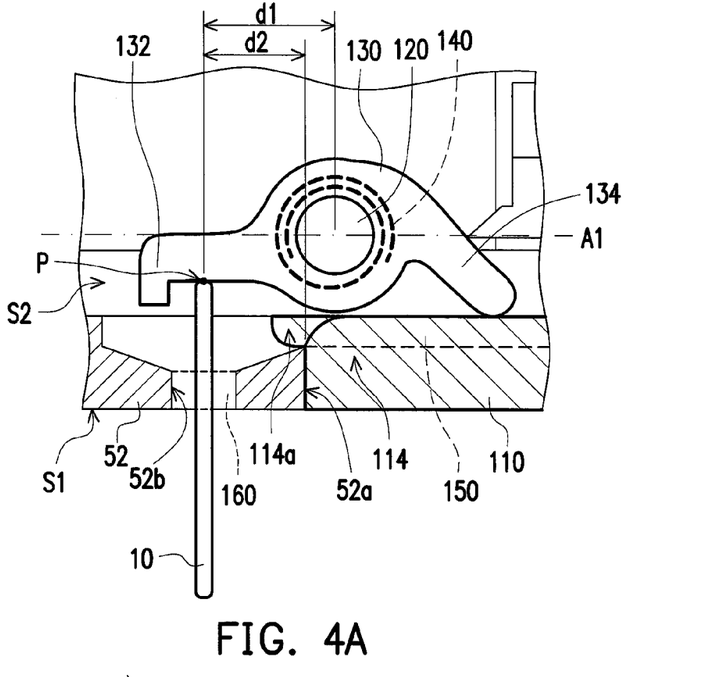
FIG. 4A is an enlarged diagram of a part of the electronic device depicted in FIG. 3A.
Figure 4B:
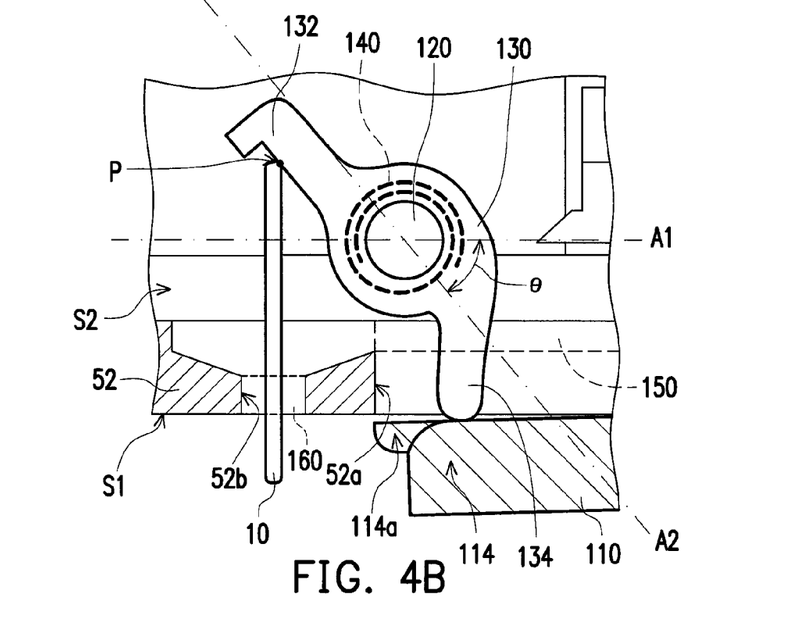
FIG. 4B is an enlarged diagram of a part of the electronic device depicted in FIG. 3B.

FIG. 4A is an enlarged diagram of a part of the electronic device depicted in FIG. 3A. FIG. 4B is an enlarged diagram of a part of the electronic device depicted in FIG. 3B. Referring FIG. 3A to FIG. 4B together, in the present embodiment, a swing travel θ of the rotating member 130 is 45 degrees. The swing travel is, for example, a degree of the rotating member 130 rotating from a status in which the pushing portion 134 leans against the second restraint member 58 (with a baseline A1 depicted in FIG. 4A as a comparison standard) to a status in which the driving portion 132 leans against the first restraint member 56 (with a baseline A2 depicted in FIG. 4B as a comparison standard), or a degree of the rotating member 130 rotating from the status in which the driving portion 132 leans against the first restraint member 56 (the baseline A2) to the status in which the pushing portion 134 leans against the second restraint member 58 (the baseline A1) Thus, the swing travel θ of the rotating member 130, or may refer to as an included angle between the baseline A1 and the baseline A2. The magnitude of the swing travel θ changes along with positions of the first restraint member 56 and the second restraint member 58, thus the magnitude of the swing travel θ may be adjusted based on actual demands and is not particularly limited in the application.

Further, referring to FIG. 4A and FIG. 4B, in the present embodiment, the second end 114 of the door cap 110 further includes a protrusion 114*a*. When the door cap 110 is located at the opening 52*a* to cover the opening 52*a*, the protrusion 114*a* of the door cap 110 may lean against an inner wall of the casing 52 to form an interference together with the casing 52 to be engaged at the opening 52*a*, so as to prevent the door cap 110 from moving voluntarily to outside of the casing 52 due to shaking caused during use of the electronic device 50. In addition, a material of the protrusion 114*a* is a soft material. When the rotating member 130 pushes the second end 114 of the door cap 110, the protrusion 114*a* of the second end 114 may be pressed by the casing 52 owing to a material characteristic of the soft material, and the interference with the casing 52 may then be released, so that the door cap 110 may move towards outside of the casing 52 to expose the opening 52*a*. Similarly, when the door cap 52 moves from outside of the casing 52 to the opening 52*a*, the protrusion 114*a* of the door cap 110 may pressed by the casing 52 to move back into the casing 52 and restore the interference with the casing 52. However, the material of the door cap 110 and whether to dispose the protrusion 114*a* or not are not particularly limited in the application.

On the other hand, referring to FIG. 4A and FIG. 4B, in the present embodiment, the door assembly 100 further includes a recover member 140 disposed between the rotating member 130 and the casing 52 and connected to the rotating member 130 and the casing 52. Accordingly, when the rotating member 130 rotates along the pivot 120 to push the second end 114 of the door cap 110 (as shown in FIG. 4A to FIG. 4B), the recover member 140 may be compressed to store a potential energy. When the pin 10 moves towards outside of the casing 52 from contacting the rotating member 130, the recover member 140 may release the potential energy to recover the rotating member 130. Accordingly, when the door cap 110 is pushed outside of the casing 52 by the rotating member 130, and the pin 10 is moved outside of the casing 52 from pushing against the rotating member 130, the rotating member 130 may be automatically recovered by the recover member 140. However, in other embodiments, the recover member 140 may be omitted, and the user may manually move the door cap 110 to the opening 52*a* while pushing the rotating member 130 to be recovered by the door cap 110.

Referring to FIG. 4A and FIG. 4B, in the present embodiment, the driving portion 132 includes a contact point P, and the pin 10 pushes against the driving portion 132 by contacting the contact point P. A distance d1 between the contact point P and a center of the pivot 120 is 0.5 mm to 3 mm. Since the contact point P may refer to as a point where the pin 10 and the driving portion 132 are contacted to each other, the distance d1 may refer to as a distance between a center line of the pin 10 and the center of the pivot 120. Meanwhile, since the rotating member 130 rotates along the pivot 120, the distance is equal to a rotating lever arm of the rotating member 130. Accordingly, in the present embodiment, a size of rotating lever arm of the rotating member 130 is 0.5 mm to 3 mm. However, the size of the distance d1 is not particularly limited in the application and may be adjusted based on actual demands.

In addition, a distance between the second end 114 of the door cap 110 and the rotating member 130 may affect a difficulty for the rotating member 130 to push the door cap 110. In other words, in case the distance between the second end 114 of the door cap 110 and the rotating member 130 is overly small or overly big, although the pin 10 may still push against the driving portion 132 to rotate the rotating member 130, it is difficult for the pushing portion 134 of the rotating member 130 to push the door cap 110, or the door cap 110 may only be pushed to move for a minor range without having the second end 114 of the door cap 100 moved to outside of the casing 52.

In the present embodiment, a distance d2 between the second end 114 of the door cap 110 and the contact point P of the driving portion 132 is between 1.5 mm to 4 mm. Since the second end 114 of the door cap 110 is corresponding to one of lateral sides of the opening 52*a*, the distance d2 may refer to as a distance between the lateral side of the opening 52*a* corresponding to the second end 114 and the contact point P. The distance d2 in FIG. 4A and FIG. 4B is 1.5 mm for example, but the distance d2 between the second end 114 of the door cap 110 (or more specifically, the lateral side of the opening 52a corresponding to the second end 114) and the contact point P may be between the 1.5 mm to 4 mm. Accordingly, the rotating member 130 may maintain in contact with the door cap 110 during the rotation, so as to ensure that the door cap 110 is pushed to outside of the casing 52 to expose the opening 52a. A size of the distance d2 is not particularly limited in the application and may be adjust based on actual demands.

Figure 5A:
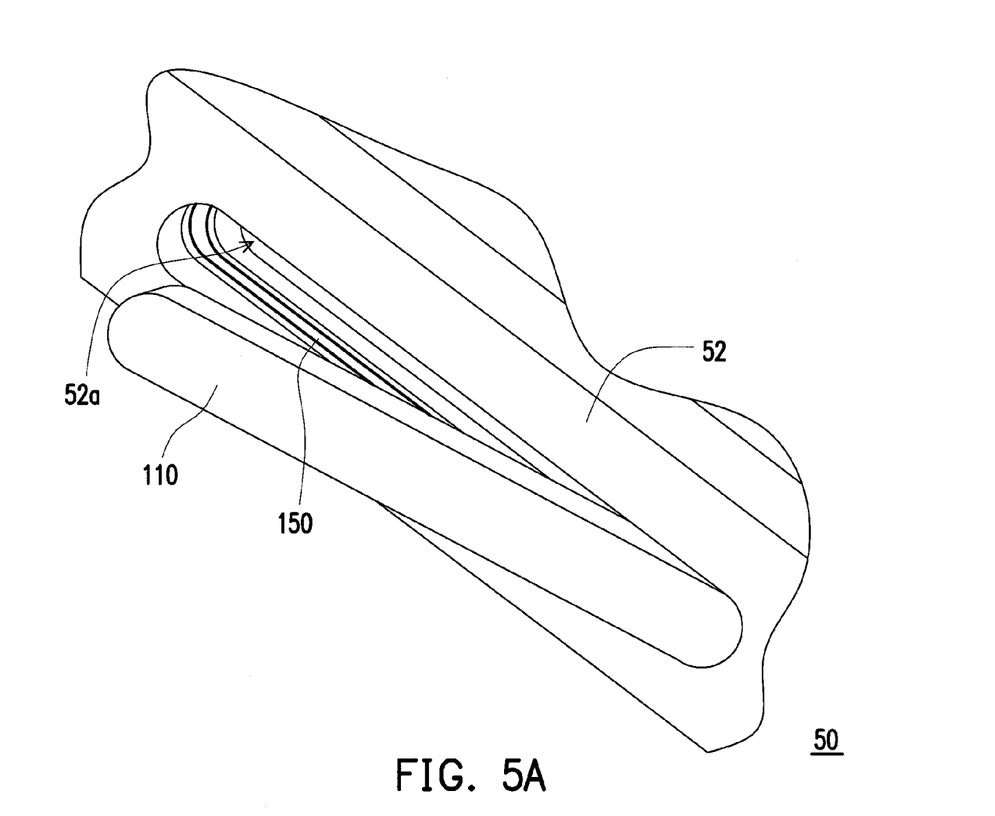
FIG. 5A is an enlarged diagram of a part of the electronic device at the opening depicted in FIG. 2.
Figure 5B:
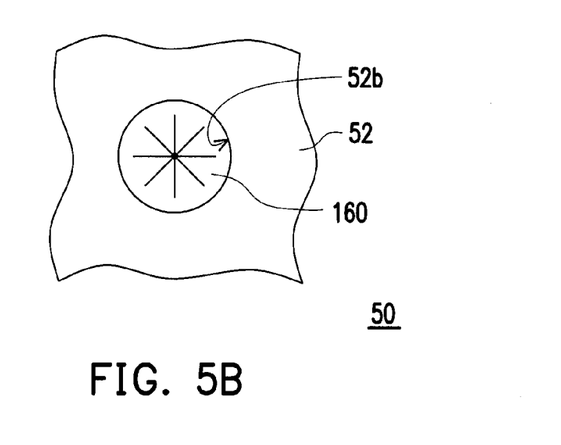
FIG. 5B is an enlarged diagram of a part of the electronic device at the pin depicted in FIG. 2.

FIG. 5A is an enlarged diagram of a part of the electronic device at the opening depicted in FIG. 2. FIG. 5B is an enlarged diagram of a part of the electronic device at the pin depicted in FIG. 2. Referring to FIG. 2, FIG. 3A, FIG. 5A together, in the present embodiment, the electronic device 50 further includes a water proof structure 150 disposed on the casing 52 and corresponding to the opening 52a. The water proof structure 150 may be disposed on a periphery of the opening 52a, or may be disposed on a side wall of the opening 52a and protruded to the periphery of the opening 52a. Accordingly, when the door cap 110 covers the opening 52a, the water proof structure 150 may prevent water from entering the casing 52 through the opening 52a. In other words, the water proof structure 150 may be used to reinforce gaps between the door cap 100 and the periphery of the opening 52a, so as to prevent water form entering the casing 52a. In addition, the water proof structure 150 may selectively use a soft material with waterproofing capability such as a water proof rubber. When the door cap 100 covers the opening 52a, the door cap 100 may press the water proof structure 150 as to form an intimate contact together with the water proof structure 150 thereby improving effectiveness in waterproofing.

Similarly, referring to FIG. 2, FIG. 3A and FIG. 5B, in the present embodiment, the electronic device 50 further includes a water proof structure 160 disposed on the casing 52 and corresponding to the insertion hole 52b. The water proof structure 160 may cover the insertion hole 52b, and a plurality of cutting lines intersected with each other are formed on the water proof structure 160 in which an insert point is formed by an intersected point of the cutting lines (as shown in FIG. 5B). The water proof structure 160 may selectively use a soft material such as the water proof rubber. When the pin 10 is inserted into the casing 52 through the insertion hole 52b, the pin 10 may penetrates the water proof structure 160 by, for example, pressing in the insert point of the water proof structure 160 to be inserted into the insertion hole 52b. Accordingly, since the water proof structure 160 covers the insertion hole 52b, in case the pin 10 is not yet inserted into the insertion hole 52b, the water proof structure 160 may prevent water from entering the casing 52 through the insertion hole 52b; and in case the pin 10 is to be inserted into the casing 52 through the insertion hole 52b, the water proof structure 160 may not interfere the pin 10. However, above-said implementations of the water proof structures 150 and 160 are merely an embodiment of the application. The water proof structures 150 and 160 of the application are not limited in above-said manner, and implementations and whether to dispose them or not may be selected based on actual demands.

Figure 6A:
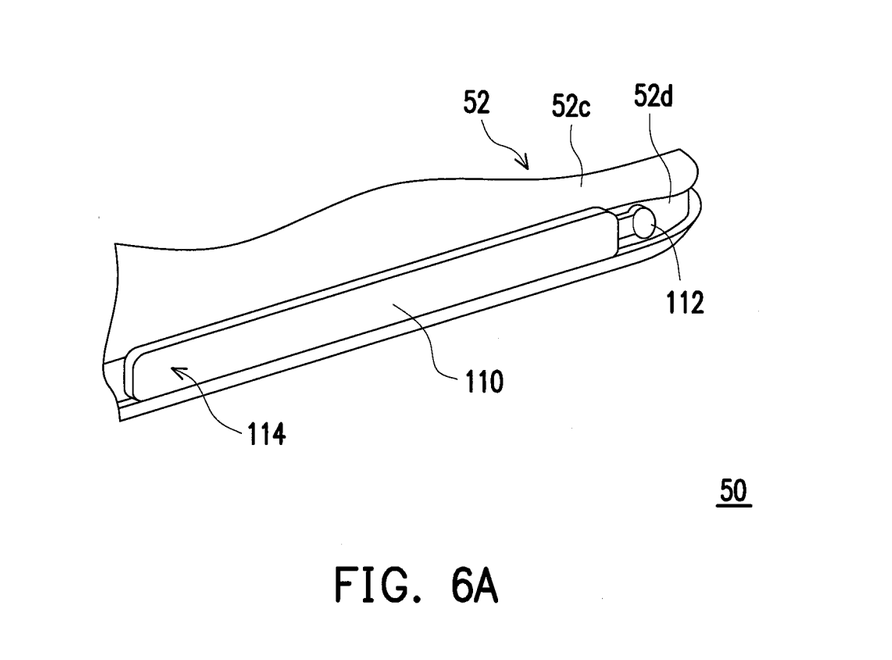
FIG. 6A is a schematic diagram of the electronic device at the opening depicted in FIG. 1.

FIG. 6A is a schematic diagram of the electronic device at the opening depicted in FIG. 1. Referring to FIG. 6A, in the present embodiment, the casing 52 of the electronic device 50 includes a back cover 52c and an inner housing 52d. The back cover 52c is covered on the inner housing 52d, and the opening 52a and the insertion hole 52b (illustrated in FIG. 1) are located on the back cover 52c. For clarity of the diagram, a part of the back cover 52c is omitted in FIG. 6A to expose a part of the inner housing 52d, and the inner housing 52d is practically hidden inside the back cover 52c. The door cap 110 of the present embodiment is disposed at the opening 52a, and the first end 112 of the door cap 110 is connected to the inner housing 52d. For instance, the door cap 110 is disposed on an outer wall of the inner housing 52d and located between the back cover 52c and the inner housing 52d. As a result, the first end 112 may be hidden inside the electronic device 50 without affecting the exterior design of the electronic device 50.

Figure 6B:
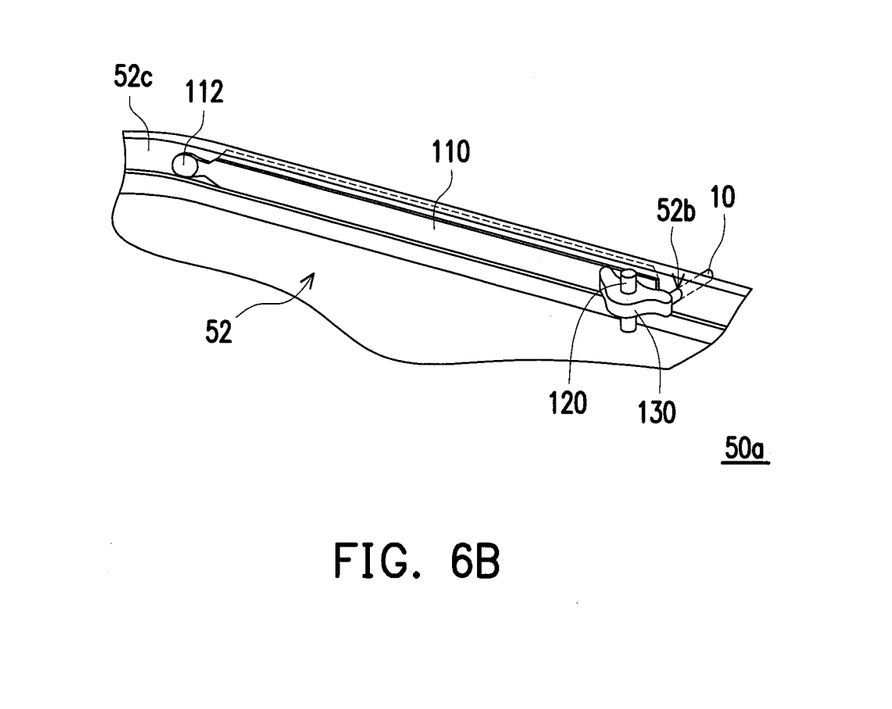
FIG. 6B is a schematic diagram of the electronic device at the opening according to another embodiment of the application.

FIG. 6B is a schematic diagram of the electronic device at the opening according to another embodiment of the application. Referring to FIG. 6B, in the present embodiment, the casing 52 of an electronic device 50a also includes the back cover 52c, and the opening 52a and the insertion hole 52b are located on the back cover 52c. A part of the back cover 52c is omitted in FIG. 6A so as to facilitate in illustrating features of the present embodiment more clearly. A major different between the electronic device 50a and the electronic device 50 of FIG. 6A is that, the door cap 110 of the present embodiment is disposed at the opening 52a, and the first end 112 of the door cap 110 is connected to an inner wall of the back cover 52c. As a result, the first end 112 may be hidden inside the electronic device 50 without affecting the exterior design of the electronic device 50. Nevertheless, in other embodiments, the casing 52 further includes other supporting members which are not illustrated. Said supporting members are disposed in the back cover 52c or the inner housing 52d, and the first end 112 of the door cap 110 is connected to the supporting members. Accordingly, connected points between the door cap 110 and the casing 52 may also be hidden inside the electronic device 50.

Based on above, in the door assembly and the electronic device of the application, the rejecting module is disposed in the casing and corresponding to the door cap, and the pin is utilized to be inserted into the casing through the insertion hole to push the rotating member of the rejecting module, so that the rotating member is pushed against by the pin to rotate along the pivot and push the door cap disposed at the opening and covering the opening to expose the opening. In view of above, the door cap of the door assembly may be directly opened by driving of the pin without disposing other opening structures thereon. As a result, the door assembly may have capabilities of water proofing and dust proofing as well as an easier opening method. Besides capabilities of water proofing, dust proofing and an easier opening method, the electronic device may also include a flat and seamless profile which provides an attractive exterior design hard to accumulate dust.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A door assembly disposed at an opening of a casing of an electronic device, wherein an insertion hole is provided at a side of the casing close to the opening for an pin to be inserted into the casing through the insertion hole, and a water proof structure is disposed on the casing and located at the insertion hole, the door assembly comprises:
    a door cap, wherein the door cap is at least partially connected to the casing and corresponding to the opening; and a rejecting module disposed in the casing and corresponding to the door cap, wherein the water proof structure covers the insertion hole, and a plurality of cutting lines intersected with each other are formed on the water proof structure in which an insert point is formed by an intersected point of the cutting lines, so that the water proof structure prevents water from entering the casing through the insertion hole in case the pin is not yet inserted into the insertion hole, and the pin is adapted to penetrate the water proof structure at the insertion hole by pressing in the insert point thereof and make the rejecting module pushing the door cap to expose the opening when the pin is inserted into the casing through the insertion hole.

2. The door assembly of claim 1, wherein the door cap is disposed at the opening to cover the opening, and the door cap has a first end connected to the casing and a second end corresponding to the first end.

3. The door assembly of claim 2, wherein the rejecting module comprises:
   a pivot disposed in the casing; and
   a rotating member pivoted in the casing through the pivot and close to the second end of the door cap, the rotating member having a driving portion and a pushing portion located at two opposite sides by the pivot respectively, the driving portion corresponding to the insertion hole, and the pushing portion corresponding to the second end of the door cap and being configured to push the second end of the door cap by rotating the rotating member along the pivot to expose the opening when the pin is inserted into the casing through the insertion hole to push against the driving portion.

4. The door assembly of claim 3, wherein the driving portion comprises a contact point, the pin pushes against the driving portion by contacting the contact point, and a distance between the contact point and a center of the pivot is ranged from 0.5 mm to 3 mm.

5. The door assembly of claim 3, wherein a distance between the second end of the door cap and the contact point of the driving portion is ranged from 1.5 mm to 4 mm.

6. The door assembly of claim 3, further comprising:
   a recover member disposed between the rotating member and the casing and connected to the rotating member and the casing, wherein the recover member is compressed to store a potential energy when the rotating member rotates along the pivot to push the second end of the door cap, and the recover member releases the potential energy to recover the rotating member when the pin moves towards outside of the casing from contacting the rotating member.

7. The door assembly of claim 3, wherein a swing travel of the rotating member is 45 degrees.

8. An electronic device, comprising:
   a casing having an opening and an insertion hole, the insertion hole is close to a side of the opening for an pin to be inserted into the casing through the insertion hole;
   a water proof structure disposed on the casing and respectively located at the insertion hole; and
   a door assembly disposed at the opening of the casing, and the door assembly comprises:
      a door cap, wherein the door cap is at least partially connected to the casing and corresponding to the opening; and
      a rejecting module disposed in the casing and corresponding to the door cap, wherein the water proof structure covers the insertion hole, and a plurality of cutting lines intersected with each other are formed on the water proof structure in which an insert point is formed by an intersected point of the cutting lines, so that the water proof structure prevents water from entering the casing through the insertion hole in case the pin is not yet inserted into the insertion hole, and the pin is adapted to penetrate the water proof structure at the insertion hole by pressing in the insert point thereof and make the rejecting module pushing the door cap to expose the opening when the pin is inserted into the casing through the insertion hole.

9. The electronic device of claim 8, wherein the door cap is disposed at the opening to cover the opening, and the door cap has a first end connected to the casing and a second end corresponding to the first end.

10. The electronic device of claim 9, wherein the casing comprises a back cover, the opening is located on the back cover, and the first end is connected to an inner wall of the back cover.

11. The electronic device of claim 9, wherein the casing comprises a back cover and an inner housing, the back cover is covered on the inner housing, the opening is located on the back cover, and the first end is connected to the inner housing and located between the back cover and the inner housing.

12. The electronic device of claim 9, wherein the rejecting module comprises:
   a pivot disposed in the casing; and
   a rotating member pivoted in the casing through the pivot and close to the second end of the door cap, the rotating member having a driving portion and a pushing portion located at two opposite side of the pivot respectively, the driving portion corresponding to the insertion hole, and the pushing portion corresponding to the second end of the door cap and being configured to push the second end of the door cap by rotating the rotating member along the pivot to expose the opening when the pin is inserted into the casing through the insertion hole to push against the driving portion.

13. The electronic device of claim 12, wherein the driving portion comprises a contact point, the pin pushes against the driving portion by contacting the contact point, and a distance between the contact point and a center of the pivot is ranged from 0.5 mm to 3 mm.

14. The electronic device of claim 12, wherein a distance between the second end of the door cap and the contact point of the driving portion is ranged from 1.5 mm to 4 mm.

15. The electronic device of claim 12, wherein the door assembly further comprises:
   a recover member disposed between the rotating member and the casing and connected to the rotating member and the casing, wherein the recover member is compressed to store a potential energy when the rotating member rotates along the pivot to push the second end of the door cap, and the recover member releases the potential energy to recover the rotating member when the pin moves towards outside of the casing from contacting the rotating member.

16. The electronic device of claim 12, wherein a swing travel of the rotating member is 45 degrees.

17. The electronic device of claim 12, further comprising:
   a connection port disposed in the casing and corresponding to the opening, wherein the opening exposes the connection port when the door cap moves towards outside of the casing form the opening.

18. The electronic device of claim 17, wherein the connection port comprises an electrical card connection port, wherein the electrical card connection port is of a tray type, a push-push type or a push-pull type.

19. The electronic device of claim 12, further comprising:
a first restraint member and a second restraint member respectively disposed in the casing, wherein the first restraint member is close to the driving portion of the rotating member, the second restraint member is close to the pushing portion of the rotating member, the rotating member rotates along the pivot until the driving portion leans against the first restraint member when the pin pushes against the driving portion, and the rotating member rotates inversely along the pivot until the pushing portion leans against the second restraint member when the pin moves towards outside of the casing from contacting the rotating member.

20. The electronic device of claim 8, further comprising a water proof structure disposed on the casing and corresponding to the opening, wherein the water proof structure is configured to prevent water from entering the casing when the door cap covers the opening.

\* \* \* \* \*